Patented July 4, 1950

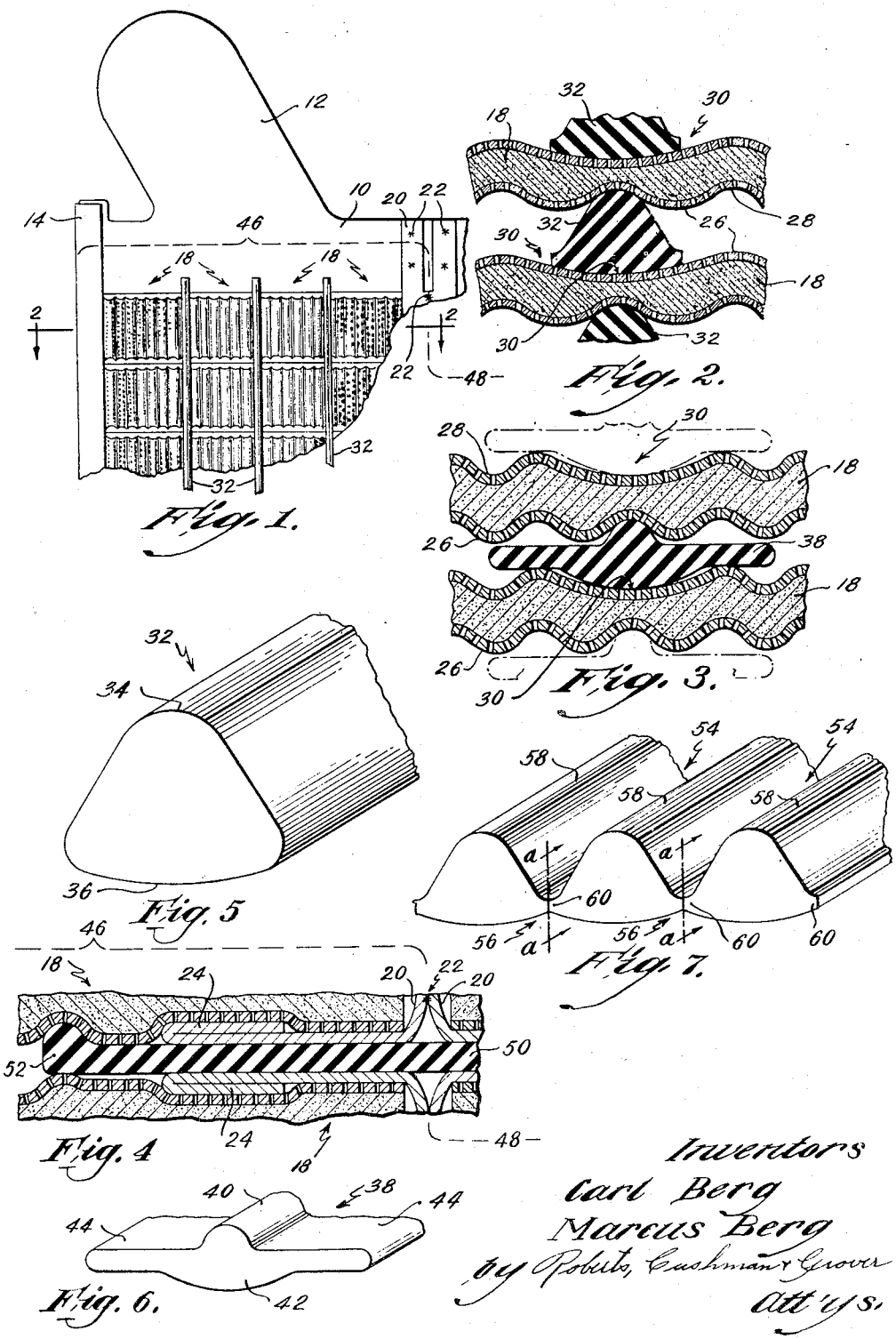

2,514,151

UNITED STATES PATENT OFFICE 2,514,151

BATTERY SEPARATOR

Carl Berg, Northampton, and Marcus Berg, Easthampton, Mass., assignors to Nickel Cadmium Battery Corporation, Easthampton, Mass., a corporation of Delaware Application February 14, 1947, Serial No. 728,466

7 Claims. (Cl. 136—146)

This invention relates to improvements in storage batteries and, in particular, to improvements in means for holding the plates of the electrode battery correctly separated.

The conventional separating members consist of sheets, strips or rods of non-conductive material disposed between the plates of the battery, these members being formed to permit free circulation of the electrolyte. In general, although separator members have been secured against longitudinal movement for example by means of spaced projections, no provision has been made to prevent relative lateral movement of the separator members and the plates, that is, there has been no secure interengagement between the plates and separators, hence the plates, particularly if narrow strips or rods are used, are likely to be displaced by jolting or vibration, with the result that their spatial relation, essential for proper operation, is disturbed.

It is an object of this invention to provide a battery with electrodes consisting of plates and separator members therebetween of such construction as to prevent any possibility of lateral shift of the separators and plates relatively to each other once the separators have been inserted between the plates.

Accordingly, in one aspect the invention resides in a battery electrode comprised of a plurality of parallel spaced plates between which are disposed separator members having portions of greater thickness than the distance between the plates and in which the plates have recesses therein for the reception of the thickened portions of such shape as to have intimate surface contact therewith and hence to prevent lateral movement between the separators and the plates. More specifically, the plates are sinuous in form, consisting of a series of crests and troughs, the plates being so designed that normally the crests and troughs in one plate lie opposite those in the next plate, but that at intervals, in corresponding sides of adjacent plates, a crest is omitted so that there is a comparatively wide trough therein opposite a trough in the adjacent plate and, at these points, there are disposed between the plates separator rods of the peculiar shape according to the invention. Each separator is uniform in cross section throughout its length and in one form is generally triangular in shape, one apex being rounded off to fit into the wide trough in one plate and the side opposite the apex being given a convex shape to fit into the trough in the adjacent plate. In another form each separator rod is in the form of a flat strip having ribs projecting from its opposite faces corresponding in curvature to the curvature of the apex and side of the aforementioned separator rod.

In another aspect invention resides in a separator rod for use in a battery to hold the electrode plates in spaced relation, which comprises an elongate member of uniform cross-section having portions of greater thickness than the minimum distance between the plates. The thickened portions have convex surfaces of different radius of curvature for engagement with recesses of corresponding curvature formed in the plates. In one form the separator rod is substantially triangular in cross-section in which the convex surface of smaller radius is at one apex and the convex surface of greater radius is constituted by the side opposite the aforesaid apex. In another form the separator rod is a flat strip of less thickness than the minimum distance between the plates having ribs projecting from its opposite sides which are convex and of different radius of curvature. In this form the thickness of the separator rod on a line through the ribs is greater than the distance between the plates and the portions extending laterally of the ribs engage one of the plates.

In still another aspect of the invention novelty resides in a sheet of non-conductive material having striae formed in its opposite faces of equal width but of different depth to provide surfaces between the striae of different radius of curvature, the striae being so formed that the troughs in one face lie opposite those in the other, thereby forming lines of weakness which permit separation of the sheet along these lines into elongate strips which are uniform in cross-section and substantially triangular in shape.

The invention will now be described in detail in its various aspects with respect to the accompanying drawings, in which Fig. 1 is a fragmentary front elevation of a single plate of a storage battery of the kind with which this invention is concerned;

Fig. 2 is a fragmentary horizontal section through a battery showing two parallel electrode plates and one type of separator therefor in cross-section;

Fig. 3 is a similar section showing another type of separator in section;

Fig. 4 is a similar section showing a modified separator for use between parallel electrode plates at points where two sections of a given plate are joined;

Fig. 5 is a perspective view of a fragmentary portion of the separator, the cross-section of which is shown in Fig. 2;

Fig. 6 is a perspective view of a fragmentary portion of a separator of the type which is shown in cross-section in Fig. 3; and Fig. 7 is a perspective view of a fragmentary portion of a sheet which may be separated along the lines a—a to provide a plurality of separators of the type shown in Fig. 5.

By way of illustration there is shown herein a battery electrode plate of the type which forms the subject matter of copending application Serial No. 711,680, filed November 22, 1946, in our names. As illustrated therein and in Fig. 1 of the accompanying drawings each plate of the electrode consists of a transverse frame with terminal member 10 and terminal portion 12 to which there are fastened outer depending frame members only one of which is shown herein, that is the member 14. The active component of the plate consists of a number of receptacles, preferably in the form of pockets 18 which are fabricated of steel and contain the electro-chemically active material of the battery, for example, nickel hydroxide and graphite for the positive plate and a mixture of oxides of cadmium and iron for the negative plate, the positive and negative plates being mechanically identical.

As illustrated, the pockets are supported intermediate the depending frame members by additional intermediate members 20 (Figs. 1 and 4) which consists of two U-shaped channels of material which may be similar to that from which the other plate elements are made, for example, nickel-plated steel. These channels are conductively secured together with their rounded web portions abutting, for example, by spot-welding at points 22 spaced in suitable intervals, for example, with approximately one weld for each pocket. The edges of the intermediate frame members 20 are turned inwardly and flanged as indicated at 24 (Fig. 4) so as to interlock with the pockets 18.

The electrode plates 10 according to the prior invention are fabricated by welding together channel strips of suitable length, if desired in a continuous process, cutting strips to the final length, punching out the web ends, and welding the end and intermediate members to the terminal frame member. The pockets 18 are then inserted into the initially somewhat open channel grooves of the frame members and thereupon locked into the channels by rolling or pressing.

The pockets and hence the walls of plates of the general type described in the aforesaid application are, as illustrated herein, sinuous in form, consisting as shown of a series of corresponding crests 26 and troughs 28 on opposite sides of each plate. A crest is omitted at intervals in one side of each plate so that there is a comparatively broad depression or trough 30 in that side, which broader trough lies opposite a trough 28 of normal dimensions in the next adjacent plate. At these points there is disposed between the plates, in accordance with one form of this invention, a rod-like separator 32 which is substantially triangular in cross-section throughout its length (Fig. 5). Along one apex the rod 32 is rounded off at 34 so that it corresponds closely in radius of curvature to the radius of curvature of the normal size trough 28. The side 36 of the rod opposite the rounded apex 34 is given a radius of curvature corresponding to that of the broadened trough 30. Hence, when the rods are disposed between the plates 10, their apexes 34 will rest in troughs 28 and their sides 36 will rest in the troughs 30 so that a very considerable amount of surface contact is attained between the rods and the plates thereby affording sufficient stability and frictional engagement to prevent movement of the rods about their longitudinal axes relative to the plates. Furthermore, since the distance between the apex and opposite side of each rod is greater than the normal minimum distance between the plates, lateral movement of the rods with respect to the plates is prevented.

In a modified form of the invention the rod may take the form of a flat strip 38 (Figs. 3 and 6) having at its opposite sides projections 40 and 42 of different radius of curvature corresponding substantially in radius of curvature to the curved surfaces 34 and 36 of the previously described rod 32 and symmetrically disposed on opposite sides lateral flange portions 44 with rounded ends. The projections 40 and 42, which are in the form of continuous ribs, rest in the troughs 28 and 30 (Fig. 3) of the adjacent plates, and the lateral portions 44 of the strip rest against the adjacent crests of one of the plates, thereby preventing any possibility of tilting of the separator due to slight departures in radius curvature between the projections and the troughs in the respective plates.

At the flat portions between sections 46 and 48 of any given plate (Figs. 1 and 4) as defined by intermediate double channels 20, the separators take the form of a strip 50 which extend across the welded intermediate frame members from one section to the next section. As shown in Fig. 4, rib-like projections 52 are provided at its edges for engagement with the troughs 28 nearest the marginal edges of the adjacent sections. The provision of the ribs 52 locks the plates against lateral movement within this flat portion of the plates.

In each form the separator rods are composed of a non-conductive material such as rubber, plastic, etc., and may be extruded in continuous lengths in the shapes illustrated and cut up into the desired lengths. Preferably, however, as illustrated in Fig. 7, a sheet of non-conductive material is formed by extrusion, molding or rolling, with longitudinal striae or narrow grooves 54 and 56 on its opposite faces of the same width but different depth so that the surfaces between the striae are of different radius of curvature. The surfaces between striae on each face are convex and are formed opposite each other and the striae are of such depth that the sheet is divided up into a plurality of narrow rib-like strips 58 joined along parallel lines by relatively thin webs 60 which may easily be broken, torn or cut along cut lines a—a to permit separation of one rib-like strip from the adjacent strip. When the separators are made up in sheet form, the torn or severed edge will be substantially square, as illustrated in Fig. 2, in contrast to an extruded strip, such as shown in Fig. 5 in which the corners of the strip are all uniformly smooth, but, since the dimensions of the separators are very small, the raw edge is not evident and, since it has no detrimental effect on the function of the strip, it is not important whether the corners are smooth or not.

While the method of making the separators in sheet form is illustrated only as to the triangular form of the separator, it is evident that strips of the cross-section shown in Fig. 3 may also be made up in sheet form, if desired, as are strips shown in Fig. 5.

We claim:

1. A separator rod for use between the plates of a battery to hold them in parallel spaced relation, comprising an elongate, flat strip of less thickness than the distance between the plates and having projecting from its opposite surfaces ribs for engagement with recesses in said plates, said ribs being convex and of different radius of curvature, and the overall thickness of the strip through the ribs being greater than the minimum distance between the plates.

2. A separator rod for use between the plates of a battery to hold them in parallel spaced relation, comprising an elongate member of uniform cross-section having opposed convex surfaces of different radius of curvature for engagement with concave recesses of corresponding radius of curvature in said plates, said member having an overall thickness in a plane normal to the median planes of said plates greater than the minimum distance between the plates.

3. A separator rod for use between the plates of a battery to hold them in parallel spaced relation, comprising an elongate member, the cross-section of which is uniform throughout and substantially triangular in shape and has opposed convex surfaces, one of which is of greater radius of curvature than the other, the distance between said surfaces along a line normal to the median planes of the plates being greater than the distance between the plates.

4. A separator rod for use between the plates of a battery for holding them in spaced relation, comprising an elongate member of substantially triangular cross-section, an apex and the side opposite said apex being convex and of different radius of curvature.

5. An article of manufacture comprising a sheet of non-conductive material having striae formed in its opposite faces of equal spacing but of different depth to provide surfaces between the striae of different radius of curvature, said sheet being separable along lines defined by said striae into elongate strips of uniform cross-section.

6. A sheet of dielectric material having formed in its opposite faces striae of different radius of curvature, said sheet being separable along lines defined by said striae into elongate strips which are uniform in cross-section and substantially triangular in shape.

7. A sheet of frangible, non-conductive material having formed in its opposite faces sinuosities of different radius of curvature in such a manner that the crests and troughs of the sinuosities in one face lie opposite the crests and troughs in the other face, said sheet being separable along the troughs into elongate strips, each having a triangular cross-section and in which the crest of less radius of curvature forms an apex and the crest of greater radius of curvature forms the side opposite said apex.

CARL BERG.
MARCUS BERG.

REFERENCES CITED

The following references are of record in the file of this patent:

UNITED STATES PATENTS

| Number | Name | Date |
|---|---|---|
| 599,315 | Crowdus | Feb. 22, 1898 |
| 1,785,202 | Lubeck | Dec. 16, 1930 |
| 2,026,030 | Galloway | Dec. 31, 1935 |
| 2,167,809 | Lubeck | Aug. 1, 1939 |

FOREIGN PATENTS

| Number | Country | Date |
|---|---|---|
| 669,791 | Germany | Oct. 24, 1939 |